Dec. 7, 1926.
E. P. BULLARD, JR
1,609,860
AUTOMOBILE BUMPER
Filed April 8, 1926
Fig. 1
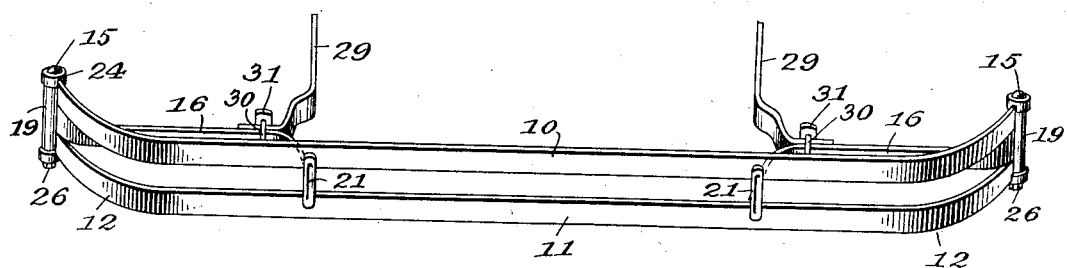
Fig. 2
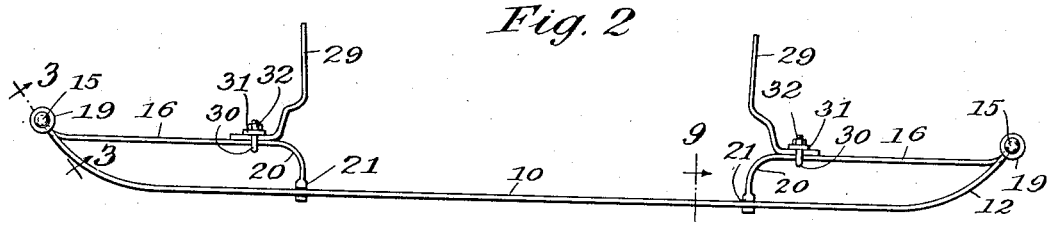
Fig. 3
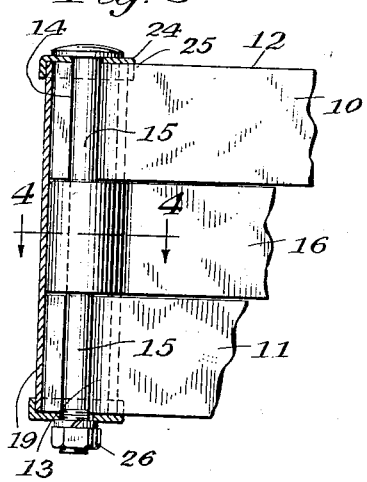
Fig. 5
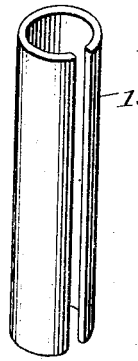
Fig. 4
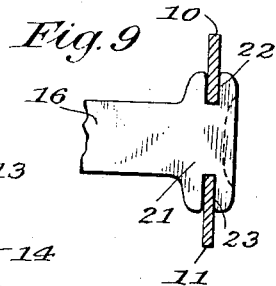
Fig. 9
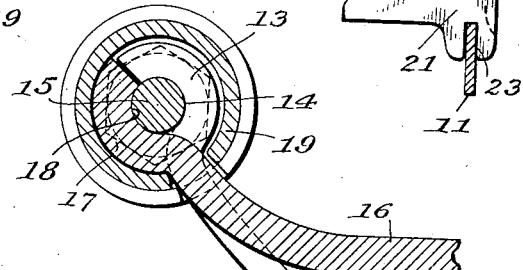
Fig. 6
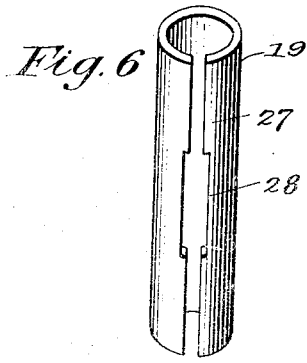
Fig. 7
Fig. 8
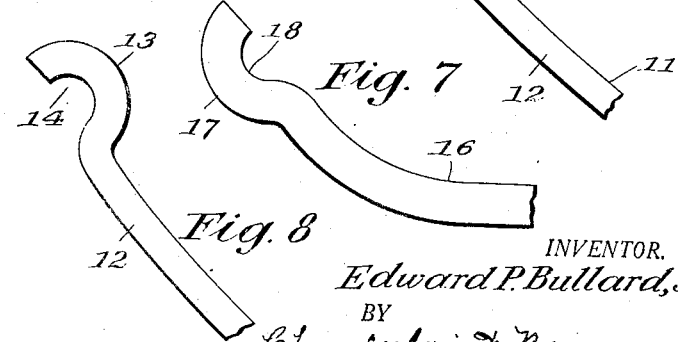
INVENTOR.
Edward P. Bullard, Jr.
BY
Chamberlain & Newman
ATTORNEYS.

Patented Dec. 7, 1926.

1,609,860

UNITED STATES PATENT OFFICE.

EDWARD P. BULLARD, JR., OF STRATFORD, CONNECTICUT, ASSIGNOR TO THE BULLARD MACHINE TOOL COMPANY, OF BRIDGEPORT, CONNECTICUT, A CORPORATION OF CONNECTICUT.

AUTOMOBILE BUMPER.

Application filed April 8, 1926. Serial No. 100,578.

This invention relates to automobile bumpers of the type employing a plurality of primary or impact bars and secondary bars arranged one above the other in a way to form a resilient bumper of simple and practical construction adapted to be supported by brackets attached to the car in a way to carry the bumper across the end of the car and in spaced relation thereto.

The type of bumper to which my invention is more particularly adapted comprises a plurality of parallel disposed impact bars, arranged in different vertical planes and extending crosswise of the ends of the car, which in practice are adapted, in case of collision, to receive the force of the blow and are therefore preferably constructed of suitable spring steel stock. The bumper structure also includes associated secondary members which are relatively short in length and positioned to the rear of the impact bars. These secondary bars, like the impact bars, are formed of resilient steel bar stock and in practice constitute the particular members of the bumper to which the supporting brackets are secured, for attaching the bumper to a car.

An object of the invention is to provide a simple and practical form of bumper which is adapted to be manufactured of a relatively small number of parts and which can be assembled in a comparatively short length of time, which when so asembled, and completed will produce an attractive and salable bumper.

The particular object or feature of the invention is to provide an end joint construction whereby the ends of the front primary bars and the ends of the secondary bars, are connected together to form a compact enclosed connection, which will form smooth round outer ends for the bumper in a manner to firmly support the end portions of the respective members directly upon and above one another in a firm yet relatively flexible manner and whereby a relative amount of movement of said bars when encountering an obstacle will be possible without distorting or injuring the said end connection. Further to design and construct the associated parts comprising this end joint so as to include an elongated, slotted tube adapted to receive the end portion of bumper bars and which upon receiving such bars may be compressed in a way to more closely close the same. I further employ caps for covering and surrounding the end portions of the tube and provide holes in said caps to receive bolts which pass longitudinally through said tube and in relation to the enclosed end portions of the several bars in a way to hold the parts together. It is also desirable in some instances to form this slot of different widths to better accommodate primary and secondary bars of different thicknesses. A further feature of the invention is to provide a tube or housing of the character described having a longitudinal slot or opening extending throughout its length.

With these and other objects in view the invention resides and consists in the construction and novel combination and arrangements of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Fig. 1 shows a front perspective view of an improved type of automobile bumper, provided with end joints constructed in accordance with my invention.

Fig. 2 is a top plan view of the same;

Fig. 3 is an enlarged vertical sectional view through one of the end joints and taken on line 3—3 of Fig. 2;

Fig. 4 represents a horizontal section taken on line 4—4 of Fig. 3;

Fig. 5 is a similarly enlarged detached perspective view of one form of tubular housing which I may employ in carrying out my invention.

Fig. 6 shows another and slightly modified form of tube which may be used to better advantage where the bars are of different thicknesses;

Fig. 7 represents a top edge view of the outer end portion of one of the short secondary bars;

Fig. 8 represents a top edge view of the end portions of one of the primary bars, and Fig. 9 represents a similarly enlarged cross sectional elevation taken on line 9—9 of Fig. 2 illustrating the connection of the inner end portion of one of the secondary bars with the two primary bars.

Referring in detail to the characters of reference marked upon the drawings, 10 represents the upper and 11 the lower impact bar which, as will be noticed, are arranged horizontally one above the other and in spaced relation to each other. The opposed end structures of these bars together with the connected cooperating and associated parts are duplicates of each other, therefore a detailed description of one set of said joints and connected structures will suffice to cover both of the said end portions. The end portions of these bars are preferably bent and deflected rearwardly as at 12 which better adapts them for the uses to which they are put. The extreme end portions of these two impact bars are of like formation being bent, as shown, to form an enlargement or head 13 upon one side and a concave recess 14 upon the opposite side to accommodate a bolt 15, later again to be referred to. The secondary bars 16 of which I employ one in the rear of the makeup of each end portion of the bumper are relatively short in length and somewhat like the impact bars are each provided with an enlargement 17 upon one side of their outer ends and a transverse recess 18 upon the opposite side to also accommodate the before mentioned bolt 15, thus forming substantially a half of a ring adapted to fit into a tubular housing 19, again to be referred to. In this connection it will be seen that the transverse concave recesses or pockets 14, as formed in these secondary bars, are on the one side while the similar recesses or pockets formed in the impact bars, are on the opposite sides and thus, though the ends are disposed in opposite relation, yet they are in proper engagement with the bolt and enclosed in the tube in a way to form a firm though slightly flexible connection.

The secondary bars 16 are preferably formed of one piece, their inner end portion being curved foward as at 20 and provided with an integral head of special design that is disposed between the two before mentioned primary bars in a way to hold them in alignment and in spaced relation to each other. These end portions or head, designated as 21, are relatively thicker and broader than the main portion of the bars and are provided with slots 22 and 23 in their upper and lower edge portions to receive the adjacent edge portions of the primary bars in a manner to support the same, as before suggested. This form of slot connection obviously permits of a slidable engagement permitting of a limited amount of movement of the end portion of the secondary bar with respect to the length of the primary bar as might be occasioned by the bumper striking an obstruction.

It will thus be seen that the end portions of the two impact bars and an end portion of the secondary bars are stacked directly one upon the other within the tubular member 19 and in direct engagement with each other. The shank portion of the said bars being positioned in the slot of the tube while the enlarged curved headed portions of the ends of the bars are housed within the said tube. The primary bars are arranged in the upper and lower end portions of the tube while the ends of the secondary bars are positioned between the ends of the said primary bars, and also within the tube so that, as before stated, said primary and secondary bars rest directly upon each other, and while held against lengthwise movement in the direction of the length of the bar, are yet susceptible of slight play within the tube.

The caps 24—24 have depending annular flanges for covering the annular face of the end portions of the tube and are provided with a notch 25 to receive the top edge portions of the upper impact bar and the bottom edge portion of the lower impact bar. The bodies of these caps rest snugly upon the opposite ends of the tube and the edge portions of the impact bar in a way to be clamped together by the bolt 15, that extends down through the center of the tube and through the concaved pockets of the ends of the bars, and secured by a nut 26 threadably attached to the lower end of said bolt.

In Fig. 6 I have provided in the tube 19 a slightly modified form of slot 27 which like the slot in the other form of tube extends throughout the full length of the tube though is preferably wider throughout its central portion 28 than it is in its end portions. This is for the purpose of accommodating thinner impact bars in the end portions of the slot and relatively thicker secondary bars in the central portion, and so that when the said bars are assembled the tube may be further closed against the opposite faces of the said bars, and the caps 24, before mentioned, positioned upon the opposite ends of the tube in a way to hold the said tube against spreading whereupon the bolt 15 is also employed in the same manner as indicated in Fig. 3.

The bumper may be secured to a car by means of a pair of brackets 29, shown in the drawing as being adjustably attached to the secondary bars 16 by means of U-bolts 30, clips 31 and nuts 32, thereby being better adapted for attachment to a larger variety of different makes of cars.

Having thus described my invention what I claim and desire to secure by Letters Patent is:—

1. The combination of two or more bumper bars having their end portions disposed one upon the other and shaped to form an enlargement upon one side of each bar and a vertical recess in the inner or opposite side, a slotted sleeve to receive and enclose the end portions of said bars, caps covering the end portions of the tubes and a bolt extending through the caps, recesses and tube to hold the parts together.

2. The combination with a tube having a slot extending throughout the length of the tube, a series of bumper bars arranged in a horizontal plane and having their end portions positioned directly one upon the other in said slot and tube, said ends enlarged within the tube to engage the same and prevent movement in the direction of the length of the bar, caps covering the end of the tube and engaging the bars and a bolt passing through the caps and in engagement with the bars to hold the parts together.

3. The combination with a tube having a slot extending throughout the length of the tube and series of bumper bars arranged in a horizontal plane and having their end portions positioned directly one upon the other in said slot and tube, the end portions of the alternate bars being bent to form enlargements on opposite sides of the alternate bars within the tube to engage the same and prevent movement in the direction of the length of the bar, caps covering the end of the tube and engaging the bars and a bolt passing through the caps and in engagement with the bars to hold the parts together.

4. The combination with a tube having a slot extending throughout its length, of a series of bumper bars arranged in a horizontal plane and having their end poritons positioned directly one upon the other in said slot and tube, said ends provided with means to prevent movement of said bars in the direction of their length, means for enclosing the ends of the tubes, and means for securing the parts together.

5. The combination with a tube having a slot extending throughout its length and being of a different relative width at one point than the remainder of said slot, a series of bumper bars arranged in a horizontal plane and having their end portions positioned one above another in said slot and tube, one of said bars being thicker than the others and positioned in the wider portion of said slot, the end portions of said bars provided with means to prevent movement of said bars in the direction of their length, means for enclosing the ends of the tubes, and means for securing the parts together.

6. The combination with a tube having a slot extending throughout its length and being wider through its central portion, a series of bumper bars arranged in a horizontal plane and having their end portions positioned one above another in said slot and tube, the intermediate one of said bars being thicker than adjacent bars, said ends provided with means to prevent movement of said bars in the direction of the length, means for enclosing the ends of the tubes, and means for securing the parts together.

7. The combination of two or more primary bumper bars arranged one above the other and in spaced relation to each other, a secondary bumper bar formed of one piece having one end connected with the end portions of the primary bar and its other integral end disposed forward between and shaped to slidably engage the adjacent edge portions of both of said primary bars.

Signed at Bridgeport in the county of Fairfield and State of Connecticut, this 6th day of April A. D. 1926.

EDWARD P. BULLARD, Jr.